Jan. 24, 1961
A. N. GRAY
2,969,419
RETRACTILE CORDS
Filed Sept. 7, 1954
2 Sheets-Sheet 1
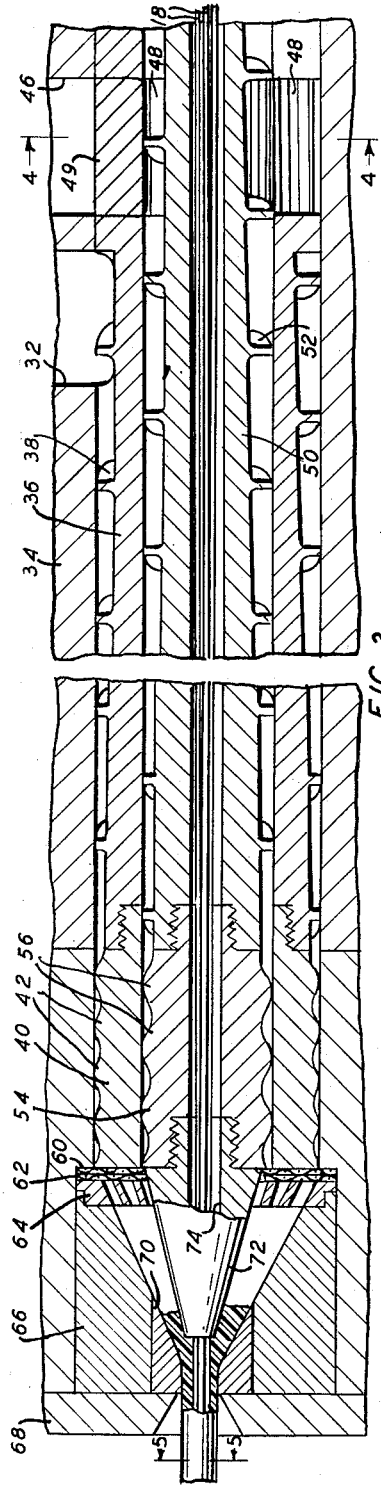
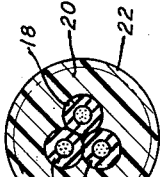
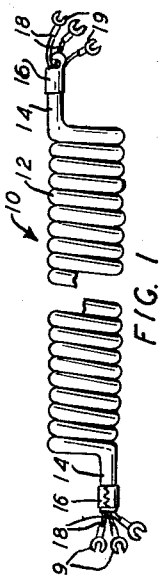
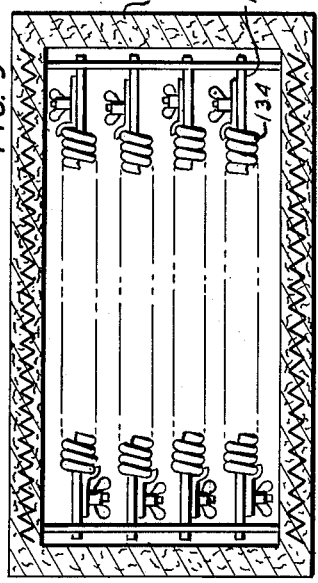
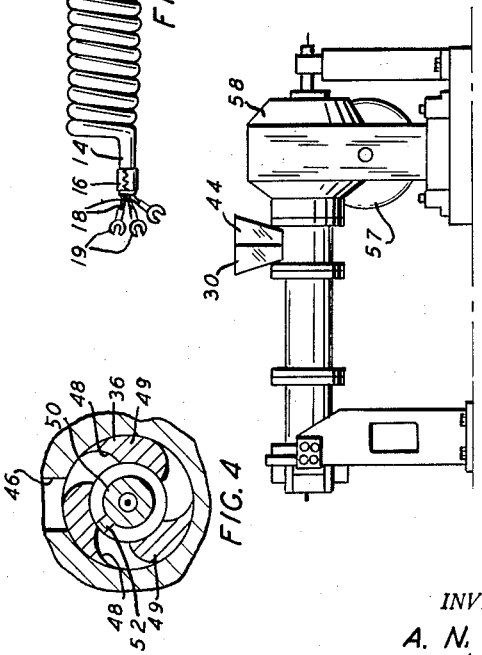
INVENTOR.
A. N. GRAY
BY
ATTORNEY

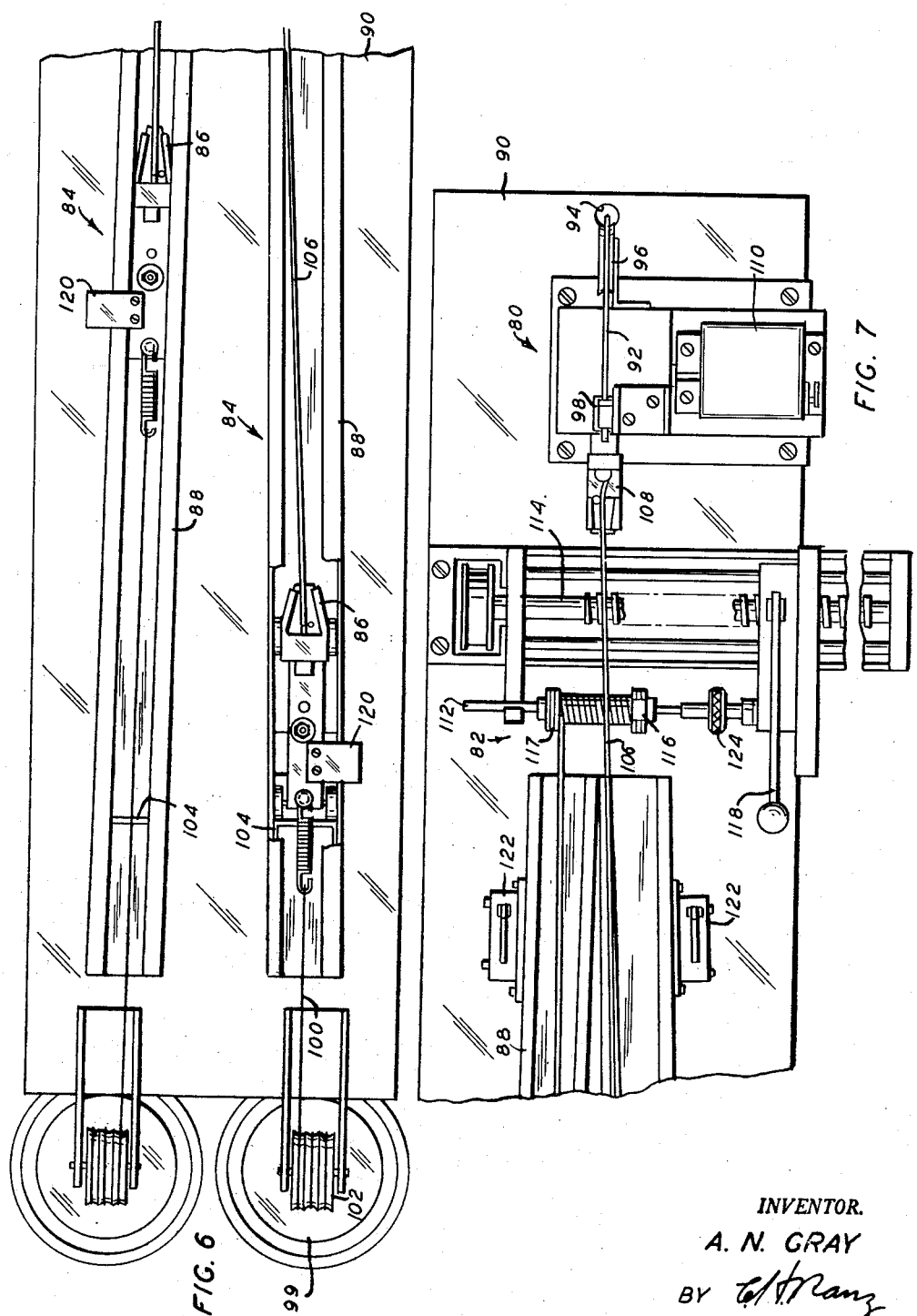
Jan. 24, 1961     A. N. GRAY     2,969,419
RETRACTILE CORDS
Filed Sept. 7, 1954     2 Sheets-Sheet 2
INVENTOR.
A. N. GRAY
BY
ATTORNEY

United States Patent Office 2,969,419
Patented Jan. 24, 1961

2,969,419

RETRACTILE CORDS

Alvin N. Gray, Edgewood, Md., assignor to Western Electric Company, Incorporated, New York, N.Y., a corporation of New York Filed Sept. 7, 1954, Ser. No. 454,323

1 Claim. (Cl. 174—69)

This invention relates to retractile cords.

The retractile cords employed commercially in the telephone industry today are provided with an exterior protective jacket, which is usually composed of an extruded, vulcanized material, such as neoprene. This jacket is formed by continuously extruding a covering of a heat curable jacketing compound around a plurality of individually insulated conductors. The cordage produced in this manner is then cut into predetermined lengths required to make the cords, each length of cordage is twisted axially and wound into a helix, and finally is heat treated while held in this twisted, helical form to impart a permanent set to the cord.

It is an object of this invention to produce new and improved retractile cords.

A cord illustrating certain features of the invention may include a predetermined length of a plurality of flexible, individually insulated conductors extending lengthwise side-by-side, and a dual layer protective jacket of thermoplastic material surrounding the insulated conductors, and including a flexible interior portion and a relatively rigid exterior portion, said cord being wound into a compact helix and set in its helical shape to render the cord retractile.

A complete understanding of the invention may be had from the following detailed description of products forming specific embodiments thereof, when read in conjunction with the appended drawings, in which:

Fig. 1 is a side elevational view of a retractile cord embodying the invention;

Fig. 2 is a fragmentary side elevation of an extruder useful to make retractile cords embodying the invention;

Fig. 3 is an enlarged, vertical section of a portion of the extruder shown in Fig. 2;

Fig. 4 is a reduced, fragmentary, vertical section taken along line 4—4 of Fig. 3;

Fig. 5 is an enlarged, vertical section taken along line 5—5 of Fig. 3, showing the internal structure of cordage suitable for use in making cords embodying the invention;

Fig. 6 is a top plan view of a portion of twisting and winding apparatus useful to make retractile cords embodying the invention;

Fig. 7 is a top plan view of a continuation from the right hand end of the apparatus shown in Fig. 6, and Fig. 8 is a vertical section of an oven in which retractile cords may be subjected to a heat treatment in the making of retractile cords embodying the invention.

Referring now to the drawings, there is shown in Fig. 1 a complete retractile cord, indicated generally by the numeral 10, embodying the invention. The cord 10 has a central body portion 12, which is formed by twisting and winding a predetermined length of jacketed cordage into a compact helix, and then subjecting it to a heat treatment to impart a permanent set to its twisted, helical shape. At opposite ends of its central body portion 12, the cord 10 is provided with straight portions 14—14 having metallic stay bands 16—16 crimped thereon. A plurality of flexible, individually insulated, electrical conductors 18—18 extend lengthwise side-by-side throughout the length of the cord 10 and are exposed at opposite ends thereof. The conductors 18—18 terminate in metallic tips 19—19, which are used to connect the retractile cord to communications equipment, such as a telephone instrument.

In a conventional retractile cord the individually insulated conductors therein, such as the conductors 18—18, would be sheathed by a single extruded outer jacket composed of vulcanizable neoprene, or the like. In accordance with the present invention, the individually insulated conductors are jacketed with a dual layer jacket composed of two intimately united, thermoplastic layers having somewhat different characteristics. As is shown clearly in Fig. 5, the conductors 18—18 are enclosed in a dual layer jacket having an inner layer 20 and a concentric outer layer 22. The two layers are intimately welded into a composite jacket which functions as a unit. Both of these two layers preferably consist essentially of a solid thermoplastic compound, such as polyvinyl chloride or a copolymer of vinyl chloride and vinyl acetate. The inner layer 20 is made somewhat pliable by incorporating a suitable plasticizer therein, while the outer layer 22 is made of unplasticized or slightly plasticized, relatively rigid plastic. In some cases it may be considered desirable to apply a woven covering, such as braided nylon filaments, to the exterior of the cord.

The plasticized inner layer 20 endows the retractile cord 10 with flexibility, while providing it with a protective jacket, and the outer layer 22 functions as a tough protective skin. The springy nature of the tough outer layer 22 contributes to the retractability of the cord, while the softer inner layer 20 acts as a cushion for the outer layer. It should be understood that the proportions selected for purposes of illustration in Fig. 5 are only schematic, and the relative thickness of the layers 20 and 22 may be varied as desired to produce the best results. The two layers are coextensive in length and they are intimately welded together throughout the length of the jacket on the cord 10. This result is preferably accomplished by extruding the two layers simultaneously onto the individually insulated conductors 18—18.

Although it is possible to form the layers 20 and 22 successively on the plurality of conductors 18—18 by the use of two extruders aligned in tandem, it is much preferred to form these two layers simultaneously by the use of a twin screw extruder in which two extrusion screws are mounted concentrically. The product obtainable from a twin screw extruder is more uniform, and the two layers are integrated together with greater tenacity. One type of twin screw extruder useful in performing methods embodying the invention is illustrated in Figs. 2, 3 and 4. Certain features of this type of extruder are disclosed and claimed in Patent 2,695,422, granted November 30, 1954 on my copending application Serial No. 261,275, filed December 12, 1951.

When using this type of extruding apparatus, a mass of unplasticized polyvinyl chloride is fed into the extruder from a hopper 30 (Fig. 2) through a feed opening 32 (Fig. 3) in an extrusion cylinder 34, which encases a tubular stock screw 36 having a helical thread 38 thereon. A tapered, tubular, stock screw extension 40 is fastened rigidly to the delivery end of the stock screw 36 and is provided with a plurality of external, helical ribs 42—42.

At the same time, a mass of polyvinyl chloride having a suitable plasticizer, such dioctyl phthalate, incorporated therein is introduced into the extruder through a hopper 44 (Fig. 2). From this hopper the plastic compound drops through a feed opening 46 (Fig. 3) formed in the cylinder 34, and thence it falls through a plurality of slots 48—48 (Fig. 4) formed in the stock screw 36. The slots 48—48 extend completely through the tubular stock screw 36 and are spaced equally about the periphery thereof. The slots 48—48 are also curved, resulting in the formation of scoop-shaped blades 49—49, which positively force the plasticized polyvinyl chloride inwardly through the stock screw 36 to an inner stock screw 50 mounted rotatably within the tubular stock screw 36.

The exterior periphery of the stock screw 50 is provided with a helical thread 52, which fits closely against the inner periphery of the tubular stock screw 36. A tapered stock screw extension 54 is fastened to the delivery end of the inner stock screw 50, and is provided with external, helical ribs 56—56. In this manner, the stock screws 36 and 50 are mounted concentrically, one within the other.

By means of a motor 57 (Fig. 2) and suitable gearing enclosed within a housing 58, the outer stock screw 36 is rotated to advance to the left, as viewed in Fig. 3, the mass of unplasticized compound supplied through the feed opening 32. At the same time, the plasticized compound supplied through the feed opening 46 is advanced in the same direction between the stock screws 36 and 50. By having the hand of the helical thread 52 on the screw 50 in a direction opposite to that of the helical thread 38 on the screw 36, the inner screw 50 may be held stationary while the outer screw 36 is rotated, or the two screws may be rotated in opposite directions, yet both compounds will be advanced simultaneously in the same direction.

The screws 36 and 50 advance the two compounds through a fine straining screen 60 and then through a coarse straining screen 62, both of which are supported on a slotted backing plate 64 mounted within a die block 66. An extrusion die 70 is secured within the block 66 in alignment with the axes of the screws 36 and 50. A centrally perforated plate 68 secures the die block 66 in place against the delivery end of the extrusion cylinder 34. A frustoconical core tube 72 having an axial passage 74 therein is secured to the delivery end of the stock screw extension 54. The core tube 72 extends centrally through the straining screens 60 and 62 as well as the backing plate 64, and protrudes into the entrance of the die 70. The plurality of individually insulated conductors 18—18 are advanced in side-by-side relation through the passage 74 in the core tube 72, and are guided thereby through the axial center of the die 70.

Both the plasticized compound and the unplasticized compound flow in the same direction through the backing plate 64, and then flow in distinct separate layers along the core tube 72 in concentric, converging, frustoconical paths towards the die 70. In passing through the die the two layers 20 and 22 (Fig. 5) are formed into a dual jacket around the individually insulated conductors 18—18, and at the same time they are inseparably united. Inevitably some intermingling occurs at the boundary between the two layers, but this is not objectionable, providing an adequate thickness of unplasticized, relatively rigid compound remains to form a protective skin on the outer surface of the extruded product.

In the next operation the cordage produced by the twin screw extruder is cut into suitable predetermined lengths required to make retractile cords, and each length of cordage is twisted about its longitudinal axis and the twisted length is wound into a helix. In Figs. 6 and 7 there is illustrated suitable apparatus for measuring the required lengths of cordage and for performing the twisting and winding operations. Certain features of this apparatus are disclosed and claimed in Patent 2,565,465, granted August 28, 1951 to W. L. Ames.

The apparatus illustrated in Figs. 6 and 7 includes a twisting device 80 and a winding device 82, which operate in conjunction with a pair of measuring and tensioning devices 84—84. Since the pair of measuring and tensioning devices 84—84 are identical in construction and in operation, only one of them need be described in detail. These two measuring devices are designed to be operated alternately, in order to increase the rate of production of the retractile cords. While one of the devices 84—84 is being used to measure the required length of cordage to produce a retractile cord, a previously cut length of cordage clamped in the other one of the devices 84—84 may be twisted and wound into a helix by the devices 80 and 82.

Each of the measuring devices 84—84 includes a chuck 86 movable along a track 88 mounted on a table 90. From a supply reel (not shown) mounted beneath the table 90, the leading end of a length of cordage 92 is drawn upwardly through an aperture 94 in the table and thence around a pulley 96. This end of the cordage 92 is passed through a catch 98 and inserted into one of the chucks 86—86 while its associated measuring device is at the right hand end, as viewed in Fig. 7, of its track 88. A weight 99 connected to the end of a cable 100 movable around a pulley 102 then is allowed to pull the loaded measuring device 84 to the left, as viewed in Fig. 6, until it strikes a stop 104 secured to the track 88. The movement of the device 84 measures out a length 106 of cordage which is required to make one retractile cord. The cordage 92 is then cut alongside the catch 98, and the free end of the length 106 of cordage is inserted into a clamp 108 mounted on the twisting device 80, as shown in Fig. 7.

The twisting device 80 is next operated to twist the cord 106 about its own longitudinal axis. During this operation the cord 106 is held under tension by the action of the weight 99 attached to the cable 100, while the opposite ends of the cord are gripped by the chuck 86 and the clamp 108. The twisting action is achieved by rotating the clamp 108 about the longitudinal axis of the cord 106. The rotating clamp 108 is driven by a motor (not shown) mounted beneath a counter 110. As a result of the twisting action, the parallel, individually insulated conductors 18—18 in the cord 106 are twisted about each other in a long-lay right-hand spiral. The counter 110 automatically shuts off the motor to stop the rotation of the clamp 108 after the desired degree of twist has been imparted to the cord 106.

In the winding device 82 the twisted cord 106 is wound into a helix on a mandrel 112, which is connected by suitable gears (not shown) to a threaded shaft 114 driven by the same motor that drives the twisting device 80. The mandrel is provided with a pair of spaced clamps 116 and 117. The end of the cord 106 is removed from the clamp 108, while keeping the cord under tension to preserve the twist therein, and this end of the cord is then inserted into the clamp 116 on the mandrel 112. By throwing a lever 118, power is transmitted from the shaft 114 to cause the mandrel 112 to rotate, thereby coiling the cord 106 in a helix on the mandrel 112. Coiling of the cord 106 on the mandrel 112 has the effect of shortening the length of the cord that is stretched between the clamp 116 and the chuck 86. This movement continues until a plate 120 carried along with the chuck 86 strikes a switch 122 positioned near the right-hand end of the track 88, as viewed in Fig. 7. When the switch 122 is actuated in this manner, the rotation of the mandrel 112 is thereby halted by the shut down of the motor. The end of the helically wound cord is then removed from the chuck 86 and is inserted into the clamp 117, which holds the cord 106 in its coiled and twisted condition on the mandrel 112.

A quickly releasable clamp 124 allows the mandrel 112 to be removed readily from the winding device 82. An empty mandrel may then be placed in the winding device 82, and operations may be resumed on another length of cordage, which has meanwhile been twisted by the device 80 during the winding operation performed on the other cord.

Since the cord is wound into a helix on the mandrel in the same direction in which it was previously twisted, the coils of the helix tend to draw together, and to hold the cord in a compact helix. However, in order to preserve the tendency of the cord to remain in its twisted, helical form, it is next subjected to a heat treatment to impart a permanent set to this form. This treatment may be carried out at from about 325° F. to about 350° F. The heat treatment has the effect of relaxing stored stresses in the plastic jacket, and of reorienting the molecules in the pattern they may then assume in the twisted, helical form of the jacket.

In Fig. 8 there is shown a portion of an oven 130 suitable for use in performing the heat treatment. The oven 130 may contain a plurality of mandrels 132—132 each having one of a plurality of cords 134—134 coiled thereon. The treated cords are removed from the oven and are allowed to cool while still on the mandrels. The final assembly operations may be completed by the addition of such items as the stay bands 16—16 (Fig. 1) and the metallic tips 19—19.

Although polyvinyl chloride is stated to be the preferred thermoplastic material for use in fabricating the jacketing layers 20 and 22 on the retractile cord 10, other suitable thermoplastic compounds may be utilized with success. For example, copolymers of vinyl chloride and vinyl acetate may be used to produce dual layer jackets on retractile cords embodying the invention by the performance of methods embodying the invention. However, relatively few thermoplastic compounds are capable of being plasticized to produce the proper characteristics for the purposes of the invention. It is conceivable that the two layers in the jacket could be composed of different plastic compounds, provided that the compounds were sufficiently compatible to form an inseparable bond between the two layers, and that the inner layer could be plasticized properly. It is also conceivable that the two layers could be composed of two different polymers of the same type of plastic compound. For example, the interior layer could be composed of low molecular weight polyethylene, and the exterior layer could be composed of high molecular weight polymers of polyethylene.

One of the outstanding advantages of retractile cords embodying the invention is the fact that they have a long service life. Thermosetting compounds, such as rubber and neoprene, tend to deteriorate with age, and thereby cause the retractile cord to loose its retractability. Furthermore, cords embodying the invention are durable and easily cleanable. Also, the thermoplastic exterior surface of cords embodying the invention is nonseizing. Consequently, these cords do not leave unsightly marks on articles they contact, such as furniture and walls. It is also possible to make cords embodying the invention smaller in diameter than conventional retractile cords, and yet still meet the required specifications for retractability, durability and effective insulation.

What is claimed is:

A retractile cord, which comprises a predetermined length of a plurality of flexible, individually insulated conductors extending lengthwise side-by-side, and a dual layer protective jacket of thermoplastic material surrounding the insulated conductors and including a soft pliable flexible, interior layer made of plasticized polyvinyl chloride and a relatively rigid tough nonseizing springy exterior layer made of unplasticized polyvinyl chloride, said interior portion forming a cushion for the exterior portion and adding flexibility to said cord, said interior and exterior layers being coextensive in length and being inseparably united throughout their length, said cord being wound into a compact helix and having been heat treated and cooled to impart a permanent set to its helical form to render the cord retractile.

References Cited in the file of this patent

UNITED STATES PATENTS

| | | |
|---|---|---|
| 2,206,934 | Barrans et al. | July 9, 1940 |
| 2,281,542 | Barrans et al. | May 5, 1942 |
| 2,408,398 | Johnson | Oct. 1, 1946 |
| 2,413,715 | Kemp et al. | Jan. 7, 1947 |
| 2,438,956 | Warner | Apr. 6, 1948 |
| 2,452,431 | Collins et al. | Oct. 26, 1948 |
| 2,525,285 | Collins | Oct. 10, 1950 |
| 2,609,417 | Cox et al. | Sept. 2, 1952 |
| 2,645,249 | Davis et al. | July 14, 1953 |
| 2,695,422 | Gray | Nov. 30, 1954 |
| 2,704,782 | Ames | Mar. 22, 1955 |